United States Patent
Shafiee Ardestani et al.

(10) Patent No.: US 12,554,964 B2
(45) Date of Patent: Feb. 17, 2026

(54) CIRCUIT FOR HANDLING PROCESSING WITH OUTLIERS

(71) Applicant: Samsung Electronics Co., Ltd., Suwon-si (KR)

(72) Inventors: Ali Shafiee Ardestani, Santa Clara, CA (US); Hamzah Ahmed Ali Abdelaziz, San Jose, CA (US); Joseph Hassoun, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 1172 days.

(21) Appl. No.: 17/493,492

(22) Filed: Oct. 4, 2021

(65) Prior Publication Data

US 2022/0414421 A1 Dec. 29, 2022

Related U.S. Application Data (60) Provisional application No. 63/215,812, filed on Jun. 28, 2021.

(51) Int. Cl.
*G06N 3/04* (2023.01)
*G06F 7/501* (2006.01)
(Continued)

(52) U.S. Cl.
CPC .............. *G06N 3/04* (2013.01); *G06F 7/501* (2013.01); *G06F 7/523* (2013.01); *G06F 7/5443* (2013.01)

(58) Field of Classification Search
CPC ........... G06N 3/04; G06F 7/501; G06F 7/523; G06F 7/5443
See application file for complete search history.

(56) References Cited

U.S. PATENT DOCUMENTS 10,387,771 B2  8/2019 Judd et al.
10,515,302 B2 12/2019 Henry et al.
(Continued)

FOREIGN PATENT DOCUMENTS

GB    2560600 B    3/2020

OTHER PUBLICATIONS

Park, Eunhyeok, Dongyoung Kim, and Sungjoo Yoo. "Energy-efficient neural network accelerator based on outlier-aware low-precision computation." 2018 ACM/IEEE 45th Annual International Symposium on Computer Architecture (ISCA). IEEE, 2018. (Year: 2018).*

(Continued)

*Primary Examiner* — Kevin W Figueroa
(74) *Attorney, Agent, or Firm* — Womble Bond Dickinson (US) LLP (57) ABSTRACT

A system and method for handling processing with outliers. In some embodiments, the method includes: reading a first activation and a second activation, each including a least significant part and a most significant part, multiplying a first weight and a second weight by the respective activations, the multiplying of the first weight by the first activation including multiplying the first weight by the least significant part of the first activation in a first multiplier, the multiplying of the second weight by the second activation including: multiplying the second weight by the least significant part of the second activation in a second multiplier, and multiplying the second weight by the most significant part of the second activation in a shared multiplier, the shared multiplier being associated with a plurality of rows of an array of activations.

20 Claims, 10 Drawing Sheets

(51) Int. Cl.
    *G06F 7/523*     (2006.01)
    *G06F 7/544*     (2006.01)

(56) References Cited

U.S. PATENT DOCUMENTS

| | | |
|---|---|---|
| 2019/0303756 A1 | 10/2019 | Chiueh et al. |
| 2020/0167632 A1 | 5/2020 | Kim et al. |
| 2021/0142155 A1 | 5/2021 | James et al. |

OTHER PUBLICATIONS

Zhao, Ritchie, et al. "Improving neural network quantization without retraining using outlier channel splitting." International conference on machine learning. PMLR, 2019. (Year: 2019).*

Kang, Yesung, et al. "Approach to improve the performance using bit-level sparsity in neural networks." 2021 Design, Automation & Test in Europe Conference & Exhibition (Date). IEEE, 2021. (Year: 2021).*

Park, E. et al., "Energy-efficient Neural Network Accelerator Based on Outlier-aware Low-precision Computation", 2018 ACM/IEEE 45th Annual International Symposium on Computer Architecture, IEEE Computer Society, 2018, pp. 688-698, IEEE.

\* cited by examiner

CIRCUIT FOR HANDLING PROCESSING WITH OUTLIERS

CROSS-REFERENCE TO RELATED APPLICATION(S)

The present application claims priority to and the benefit of U.S. Provisional Application No. 63/215,812, filed Jun. 28, 2021, entitled "IMPROVING AREA AND POWER EFFICIENCY USING ACTIVATION OUTLIER VALUES", the entire content of which is incorporated herein by reference.

FIELD

One or more aspects of embodiments according to the present disclosure relate to neural network calculations, and more particularly to a system and method for handling outliers.

BACKGROUND

Computations performed by artificial neural networks may involve calculating sums of products, as, for example, when a convolution operation is performed. Each product may be a product of a weight and an activation, and in some situations the distribution of activation values may be such that only a relatively small number of activations, which may be referred to as "outliers", exceed a threshold value such as 15 or 31. In such a situation, processing of all of the products in the same manner may be wasteful, because, for example, when any of the activations are 5 bits wide, a 5×8 bit multiplier may be used, instead of a 4×8 bit multiplier, to multiply a number of 4-bit activations by 8-bit weights.

Thus, there is a need for an improved system and method for handling outliers.

SUMMARY

According to an embodiment of the present disclosure, there is provided a method including: reading a first activation from a first row of an array of activations, the first activation including a least significant part and a most significant part, the most significant part being zero; multiplying a first weight by the first activation; reading a second activation from a second row of the array of activations, the second activation including a least significant part and a most significant part, the most significant part being nonzero; and multiplying a second weight by the second activation, the multiplying of the first weight by the first activation including multiplying the first weight by the least significant part of the first activation in a first multiplier, the first multiplier being associated with the first row; the multiplying of the second weight by the second activation including: multiplying the second weight by the least significant part of the second activation in a second multiplier, the second multiplier being associated with the second row; and multiplying the second weight by the most significant part of the second activation in a shared multiplier, the shared multiplier being associated with a plurality of rows of the array of activations, including the first row and the second row.

In some embodiments, the method further includes: reading a third activation from a third row of the array of activations, the third activation including a least significant part and a most significant part, the most significant part being nonzero; and multiplying a third weight by the third activation, wherein the multiplying of the third weight by the third activation includes: multiplying the third weight by the least significant part of the third activation in a third multiplier, the third multiplier being associated with the third row of the array of activations; and storing the most significant part of the third activation in a first row of a buffer including a plurality of rows, the first row of the buffer being associated with the third row of the array of activations.

In some embodiments, the method further includes incrementing a counter associated with the first row of the buffer.

In some embodiments, the storing of the third activation in the first row of the buffer includes determining that a value of the counter associated with the first row of the buffer is less than or equal to a value of a counter associated with a row of the buffer corresponding to the second activation.

In some embodiments, the multiplying of the third weight by the most significant part of the third activation further includes: retrieving the most significant part of the third activation from the buffer, and multiplying the third weight by the most significant part of the third activation in the third multiplier.

In some embodiments, the multiplying of the third weight by the most significant part of the third activation further includes: retrieving the most significant part of the third activation from the buffer, and multiplying the third weight by the most significant part of the third activation in the shared multiplier.

In some embodiments, the most significant part of the third activation has a width of four bits and the least significant part of the third activation has a width of four bits.

In some embodiments, the most significant part of the third activation has a width of three bits and the least significant part of the third activation has a width of five bits.

In some embodiments, the shared multiplier includes: a first partial-width multiplier; a second partial-width multiplier; and an adder.

According to an embodiment of the present disclosure, there is provided a system, including: a processing circuit including: a first multiplier; a second multiplier; and a shared multiplier; the processing circuit being configured to: read a first activation from a first row of an array of activations, the first activation including a least significant part and a most significant part, the most significant part being zero; multiply a first weight by the first activation; read a second activation from a second row of the array of activations, the second activation including a least significant part and a most significant part, the most significant part being nonzero; and multiply a second weight by the second activation, the multiplying of the first weight by the first activation including multiplying the first weight by the least significant part of the first activation in the first multiplier, the first multiplier being associated with the first row; the multiplying of the second weight by the second activation including: multiplying the second weight by the least significant part of the second activation in the second multiplier, the second multiplier being associated with the second row; and multiplying the second weight by the most significant part of the second activation in the shared multiplier, the shared multiplier being associated with a plurality of rows of the array of activations, including the first row and the second row.

In some embodiments, the processing circuit is further configured to: read a third activation from a third row of the array of activations, the third activation including a least significant part and a most significant part, the most significant part being nonzero; and multiply a third weight by the third activation, wherein the multiplying of the third weight by the third activation includes: multiplying the third weight by the least significant part of the third activation in a third multiplier, the third multiplier being associated with the third row of the array of activations; and storing the most significant part of the third activation in a first row of a buffer including a plurality of rows, the first row of the buffer being associated with the third row of the array of activations.

In some embodiments, the processing circuit is further configured to increment a counter associated with the first row of the buffer.

In some embodiments, the storing of the third activation in the first row of the buffer includes determining that a value of the counter associated with the first row of the buffer is less than or equal to a value of a counter associated with a row of the buffer corresponding to the second activation.

In some embodiments, the multiplying of the third weight by the most significant part of the third activation further includes: retrieving the most significant part of the third activation from the buffer, and multiplying the third weight by the most significant part of the third activation in the third multiplier.

In some embodiments, the multiplying of the third weight by the most significant part of the third activation further includes: retrieving the most significant part of the third activation from the buffer, and multiplying the third weight by the most significant part of the third activation in the shared multiplier.

In some embodiments, the most significant part of the third activation has a width of four bits and the least significant part of the third activation has a width of four bits.

In some embodiments, the most significant part of the third activation has a width of three bits and the least significant part of the third activation has a width of five bits.

In some embodiments, the shared multiplier includes: a first partial-width multiplier; a second partial-width multiplier; and an adder.

According to an embodiment of the present disclosure, there is provided a system, including: means for processing including: a first multiplier; a second multiplier; and a shared multiplier; the means for processing being configured to: read a first activation from a first row of an array of activations, the first activation including a least significant part and a most significant part, the most significant part being zero; multiply a first weight by the first activation; read a second activation from a second row of the array of activations, the second activation including a least significant part and a most significant part, the most significant part being nonzero; and multiply a second weight by the second activation, the multiplying of the first weight by the first activation including multiplying the first weight by the least significant part of the first activation in the first multiplier, the first multiplier being associated with the first row; the multiplying of the second weight by the second activation including: multiplying the second weight by the least significant part of the second activation in the second multiplier, the second multiplier being associated with the second row; and multiplying the second weight by the most significant part of the second activation in the shared multiplier, the shared multiplier being associated with a plurality of rows of the array of activations, including the first row and the second row.

In some embodiments, the means for processing is further configured to: read a third activation from a third row of the array of activations, the third activation including a least significant part and a most significant part, the most significant part being nonzero; and multiply a third weight by the third activation, wherein the multiplying of the third weight by the third activation includes: multiplying the third weight by the least significant part of the third activation in a third multiplier, the third multiplier being associated with the third row of the array of activations; and storing the most significant part of the third activation in a first row of a buffer including a plurality of rows, the first row of the buffer being associated with the third row of the array of activations.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for handling outliers provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Inference operations performed by an artificial neural network may involve the calculations of convolutions or other operations involving the multiplication of arrays of weights and arrays of activations. Deep neural networks (DNNs) may be implemented using groups of multiplier-accumulator (MAC) units or inner product units with 8-bit multipliers. In some circumstances, it may be possible to represent a large proportion of the activations as low-bit numbers (e.g., as numbers having a small bit width). The remainder of the activations may then be referred to as "outliers". In such a situation, if products and sums are formed in small groups at a time, the proportion of such groups having more than two outliers (i.e., more than two numbers exceeding a threshold bit width) may be quite small. For example, if 10% of activations exceed a certain bit width (e.g., 4 bits; i.e., 10% of the activations are greater than 15), and if these "outlier" activations are randomly distributed within the set of activations, then the probability that a randomly chosen set of four activations will include at most one outlier is 94.77%. Accordingly, multipliers may be grouped together into small circuits referred to as "bricks". Moreover, an additional, shared multiplier may be included in each brick to handle the most significant part of an outlier, as discussed in further detail below.

Figure 1:
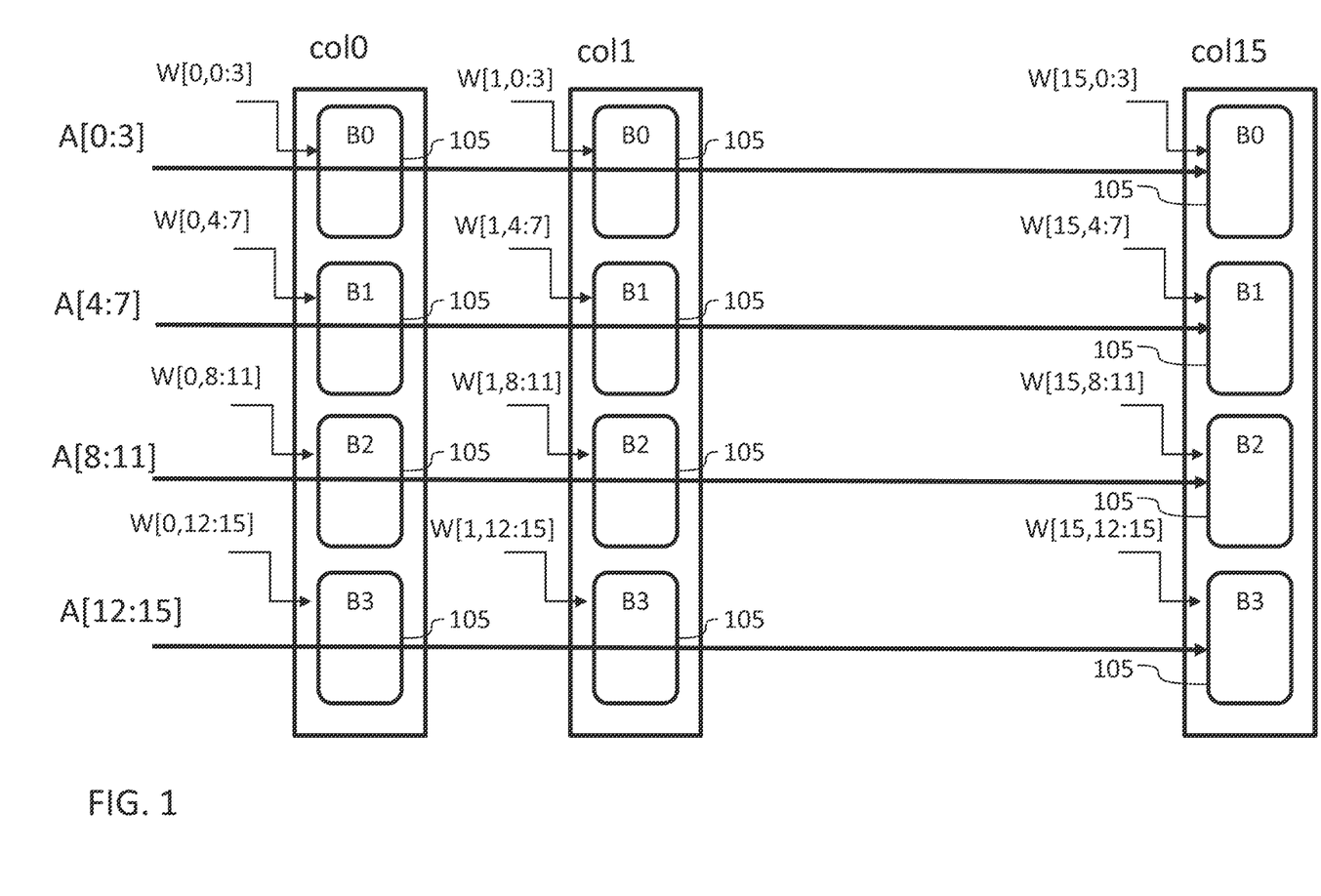
FIG. 1 is a block diagram of a portion of a processing system for performing neural network calculations, according to an embodiment of the present disclosure.

FIG. 1 shows a processing tile which may be employed to multiply a two-dimensional array of weights (a 16×16 array of weights, W[0,0] through W[15,15], in the example of FIG. 1) by a vector of activations (A[0] through A[15] in the example of FIG. 1). The tile includes 32 circuits referred to as "bricks" 105, arranged in 16 columns. FIG. 1 shows a 4×16 array of bricks, but the invention is not limited to such a configuration and the array may have any size. The activations are broadcast, within each row, to all of the columns, so that in each processing cycle each activation is multiplied by a plurality of weights (e.g., by 16 weights).

Figure 2A:
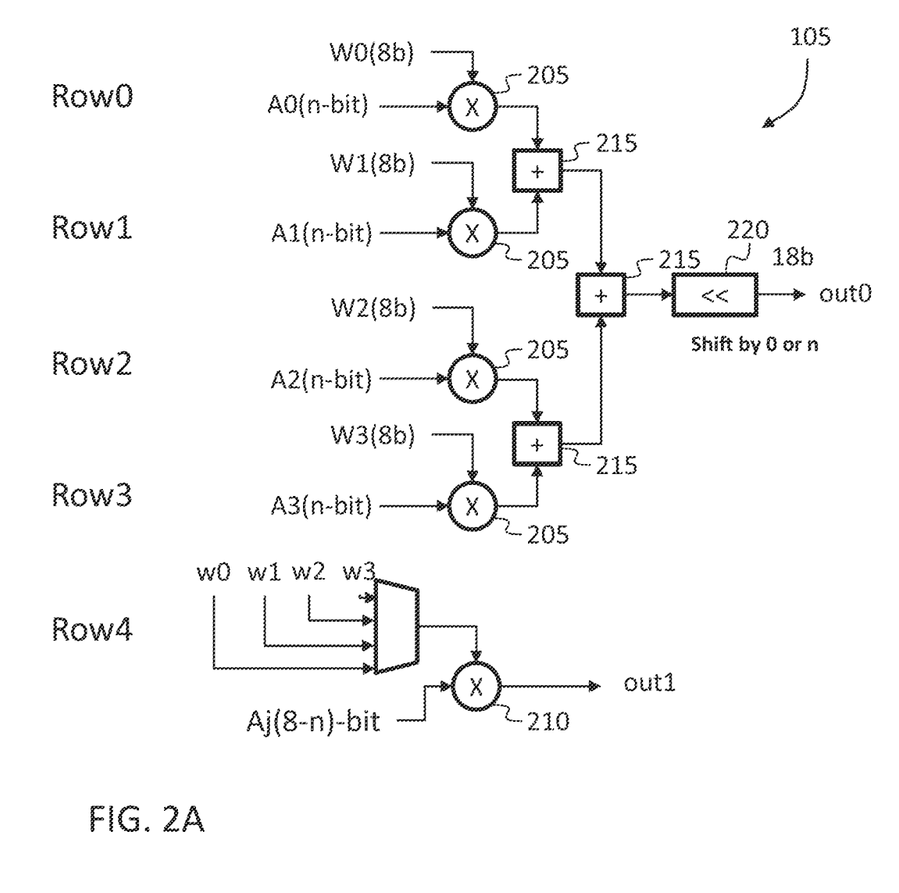
FIG. 2A is a block diagram of a portion of a processing system for performing neural network calculations, according to an embodiment of the present disclosure.

FIG. 2A shows a brick 105 (or a portion of a brick), in some embodiments. The brick 105 is configured to handle a least significant part having a width of n bits; activations that are wider than n bits (i.e., activations that have a nonzero most significant part) are treated as outliers, and their most significant parts are handled separately, as discussed in further detail below. The brick includes five rows. Of these, each of the first four rows includes a multiplier 205, which may be referred to as a "row multiplier", dedicated to the row. The fifth row includes a shared multiplier 210. This multiplier is shared in the sense that (i) one of its inputs is connected to a multiplexer 215 which can select any of the four weights, and that (ii) the other input may be fed the most significant part of any of the activations, as discussed in further detail below. Products formed by the row multipliers 205 are summed together in an adder tree including three adders 215, and the output is optionally shifted by n bits by a controllable shifter 220.

The least significant part of each activation may be the n least significant bits (e.g., the 4 least significant bits or the 5 least significant bits), and e each of the row multipliers 205 may be an n×8 bit multiplier. If the activations are 8-bit numbers then the most significant part of any activation may be the 8−n bits remaining when the least significant part (which has a width of n bits) of the number is removed. The shared multiplier 210 may be an (8−n)×8 bit multiplier. In operation, in a given cycle, four activations may be received by the brick. If n=4, then each of the row multipliers 205 may multiply the least significant part (i.e., the least significant nibble) of a respective activation by a respective weight. If one of the four activations is an outlier (i.e., if one of the four activations has a most significant part that is nonzero), then the most significant part of the outlier may be multiplied by the appropriate weight in the shared multiplier 210.

If none of the four activations is an outlier, the shared multiplier 210 may be idle during the corresponding cycle. If more than one of the four activations is an outlier, then one of the corresponding nonzero most significant parts may be multiplied by the appropriate weight in the shared multiplier 210, and the remaining most significant parts may be stored in a buffer (which may be referred to as a "residue buffer" 315 (FIG. 3A)), as discussed in further detail below. The width n of the least significant part of the activations may be selected according to the expected distribution of activation values, and based on the hardware requirements (a larger value of n requiring that the row multipliers 205 be larger, for example). For example, (i) n may be equal to 4, each of the row multipliers 205 may be a 4×8 multiplier, and the shared multiplier 210 may be a 4×8 multiplier, or (ii) n may be equal to 5, each of the row multipliers 205 may be a 5×8 multiplier, and the shared multiplier 210 may be a 3×8 multiplier. The circuit of FIG. 2A may reduce the critical path, while keeping the performance of 8×8 multiplication.

Figure 2B:
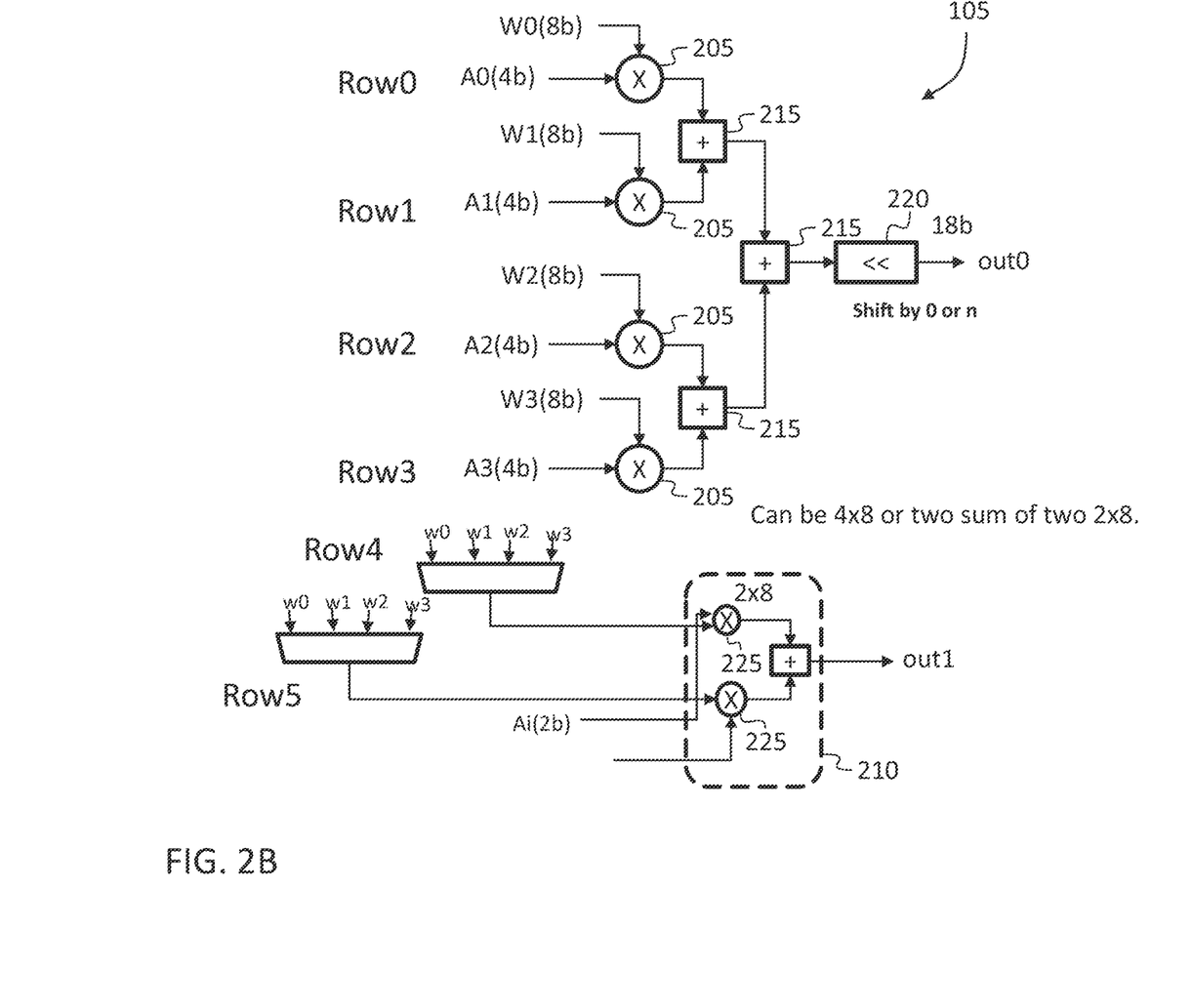
FIG. 2B is a block diagram of a portion of a processing system for performing neural network calculations, according to an embodiment of the present disclosure.

FIG. 2B shows a brick 105 (or a portion of a brick), in some embodiments. The embodiment of FIG. 2B differs from that of FIG. 2A in that the shared multiplier 210, in the embodiment of FIG. 2B, is a composite, configurable multiplier including two multipliers, which may be referred to as "partial width" multipliers 225, and an adder. Further, the embodiment of FIG. 2B has six rows, with the fifth and sixth rows being connected to the composite shared multiplier 210. The adder of the shared multiplier 210 may have the capability to shift the value at one of the inputs before adding it to the value at the other input, so that the adder may treat the two inputs as the most significant part and the least significant part (i.e., as the two partial products) of a (4×8) product, or it may treat the two inputs as being two products of the same significance, so that the output of the adder is the sum of the two products. For example, n may be equal to 4, each of the row multipliers 205 may be a 4×8 multiplier, and the shared multiplier 210 may be configured (during operation) either (i) as a 4×8 multiplier (capable of handling a most significant part with up to 4 non-zero bits), or (ii) as two 2×8 multipliers, capable, together, of handling two most significant parts with up to two non-zero bits each).

Figure 3A:
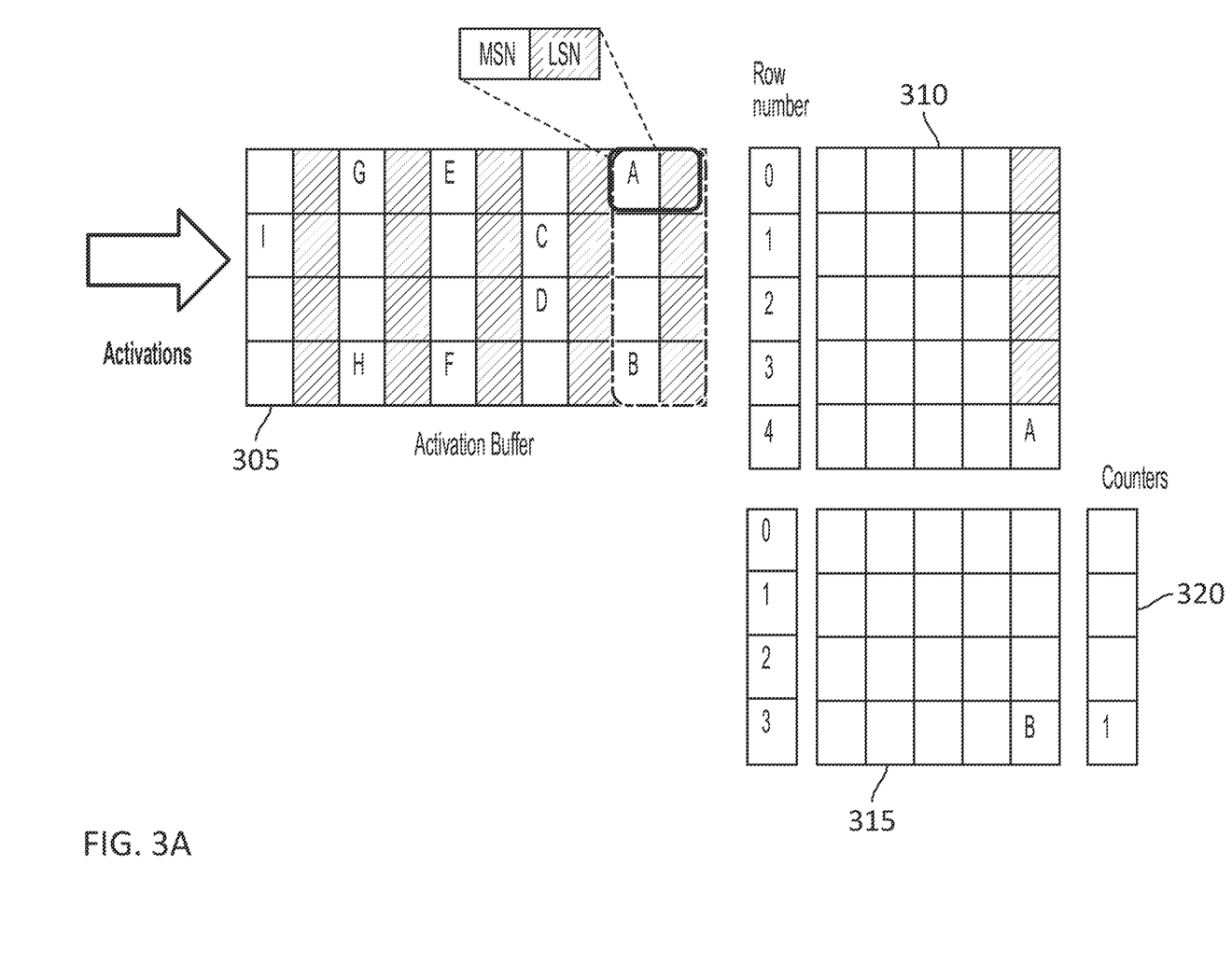
FIG. 3A is a data layout and flow diagram, according to an embodiment of the present disclosure.

FIGS. 3A-3F illustrate the operation of a processing circuit, with an example set of activations. The processing circuit broadcasts activations to a set of bricks 105 that receive the same broadcasts (e.g., to one of the four such sets of bricks 105 shown in FIG. 1). FIG. 3A shows an activation buffer 305 storing an array of activations to be processed. Each pair of columns of the activation buffer 305 stores (i) a set of least significant parts (e.g., least significant nibbles (LSNs)) in the right-hand column of the pair of columns, and (ii) a set of most significant parts (e.g., most significant nibbles (MSNs)) in the left-hand column of the set of columns. A blank cell in any of the left-hand columns indicates that the corresponding most significant part is zero. The activations are processed from right to left from the activation buffer 305, i.e., the right-most two columns are processed first. As illustrated in FIG. 3A, the first two columns contain four activations, two of which are outliers; the outliers are in the first and fourth rows (of the activation buffer 305, and of the array stored in the activation buffer 305), with most significant parts A and B, respectively.

The four least significant parts are broadcast in four respective rows, to the set of bricks (i.e., to the set of bricks 105 that receive the same broadcasts). This broadcasting is shown in the processing history table 310 of FIG. 3A; this table does not correspond to a physical structure in the processing circuit but is used in FIGS. 3A-3F to show the history of activations that have been processed at any time. The most significant part, A, of one of the outliers is broadcast to the shared multiplier 210 of each of the bricks of the set of bricks. The most significant part, B, of the other outlier is saved in the residue buffer 315, in the same row (i.e., in the fourth row, row 3) as the row of the activation buffer 305 in which the other outlier was stored. The processing circuit includes a set of residue counters 320; the counter 320 corresponding to the newly occupied row (i.e., to the fourth row) of the residue buffer 315 is incremented by one.

Figure 3B:
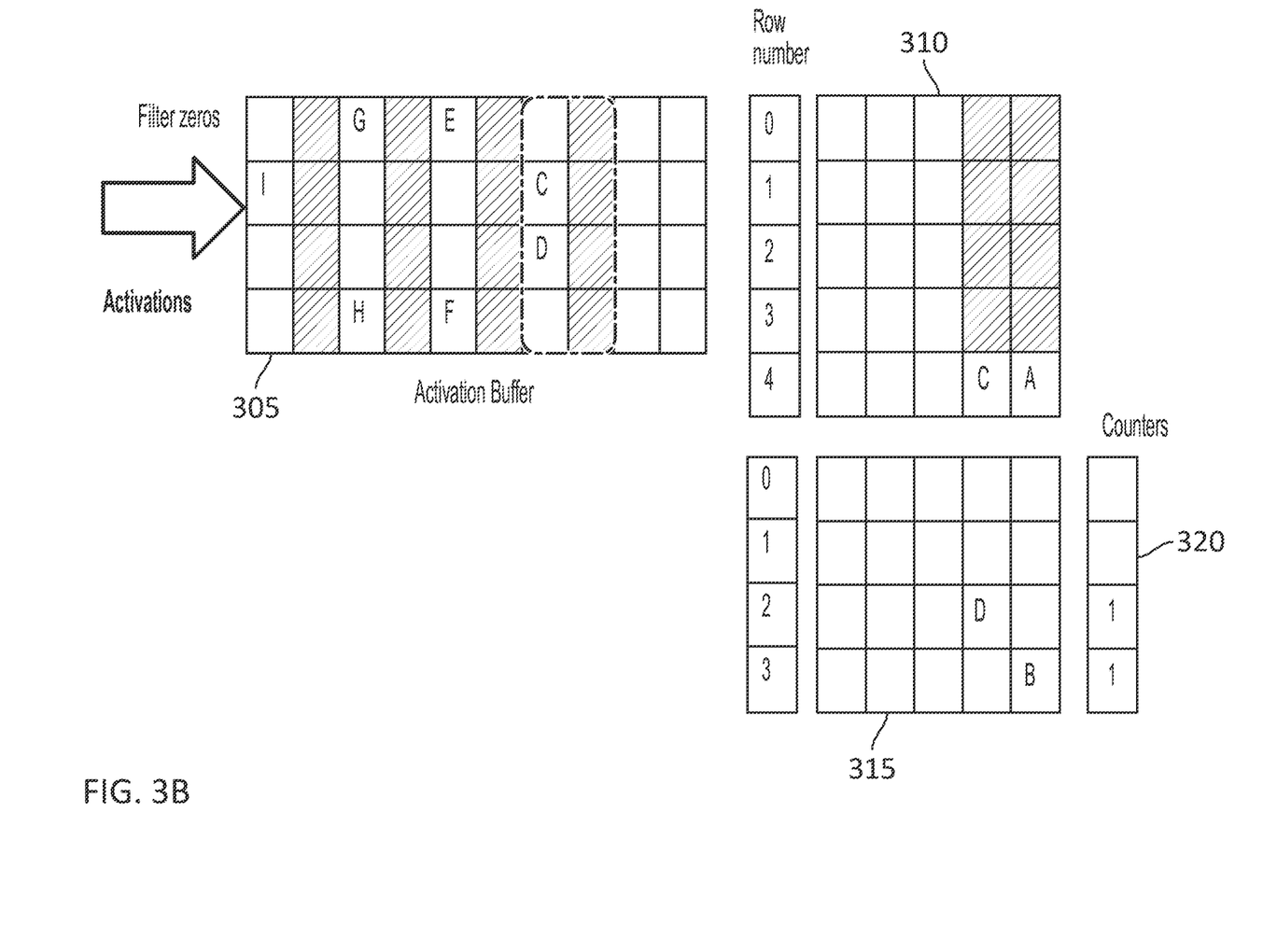
FIG. 3B is a data layout and flow diagram, according to an embodiment of the present disclosure.

FIG. 3B shows a cycle subsequent to that of FIG. 3A. In FIG. 3B, the second set of activations (in the second pair of columns (from the right) of the activation buffer 305) is processed. As in the preceding cycle (illustrated in FIG. 3A), the four least significant parts are broadcast in four respective rows to the set of bricks. The second set of activations includes two outliers, with most significant parts C and D, in the second and third rows. The most significant part C of the first of these is broadcast to the shared multiplier 210 of each of the bricks of the set of bricks. The most significant part, D, of the other outlier is saved in the residue buffer 315, in the same row (i.e., in the third row, row 2, which is the row of the activation buffer 305 in which the other outlier was stored). The counter 320 corresponding to this row (i.e., to the third row) is incremented by one.

Figure 3C:
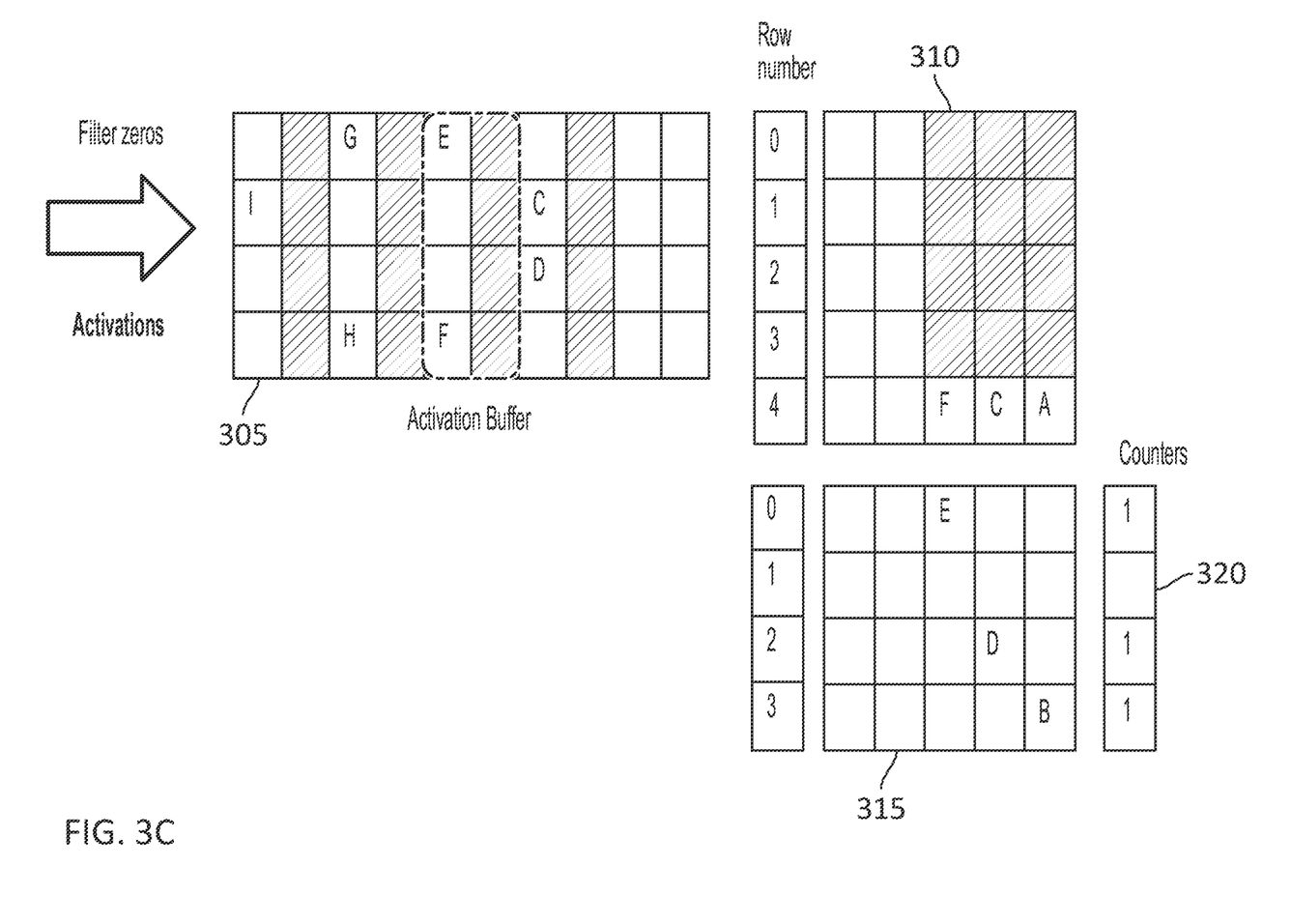
FIG. 3C is a data layout and flow diagram, according to an embodiment of the present disclosure.

In FIG. 3C, the third set of activations (in the third pair of columns (from the right) of the activation buffer 305) is processed. This set of activations includes two outliers, one in the first row and one in the fourth row. As indicated by the counters 320, the fourth row of the residue buffer 315 already contains an entry (B) and the first row of the residue buffer 315 does not yet contain an entry. The residue buffer 315 is filled, when possible, in a manner that keeps the number of entries in each row as nearly equal as possible; this allows for more efficient subsequent processing of the entries saved in the residue buffer 315, as discussed in further detail below. For this reason, the most significant part of the first activation (i.e., E) is saved in the residue buffer 315, and the most significant part of the fourth activation (i.e., F) is broadcast to the shared multipliers 210.

Figure 3D:
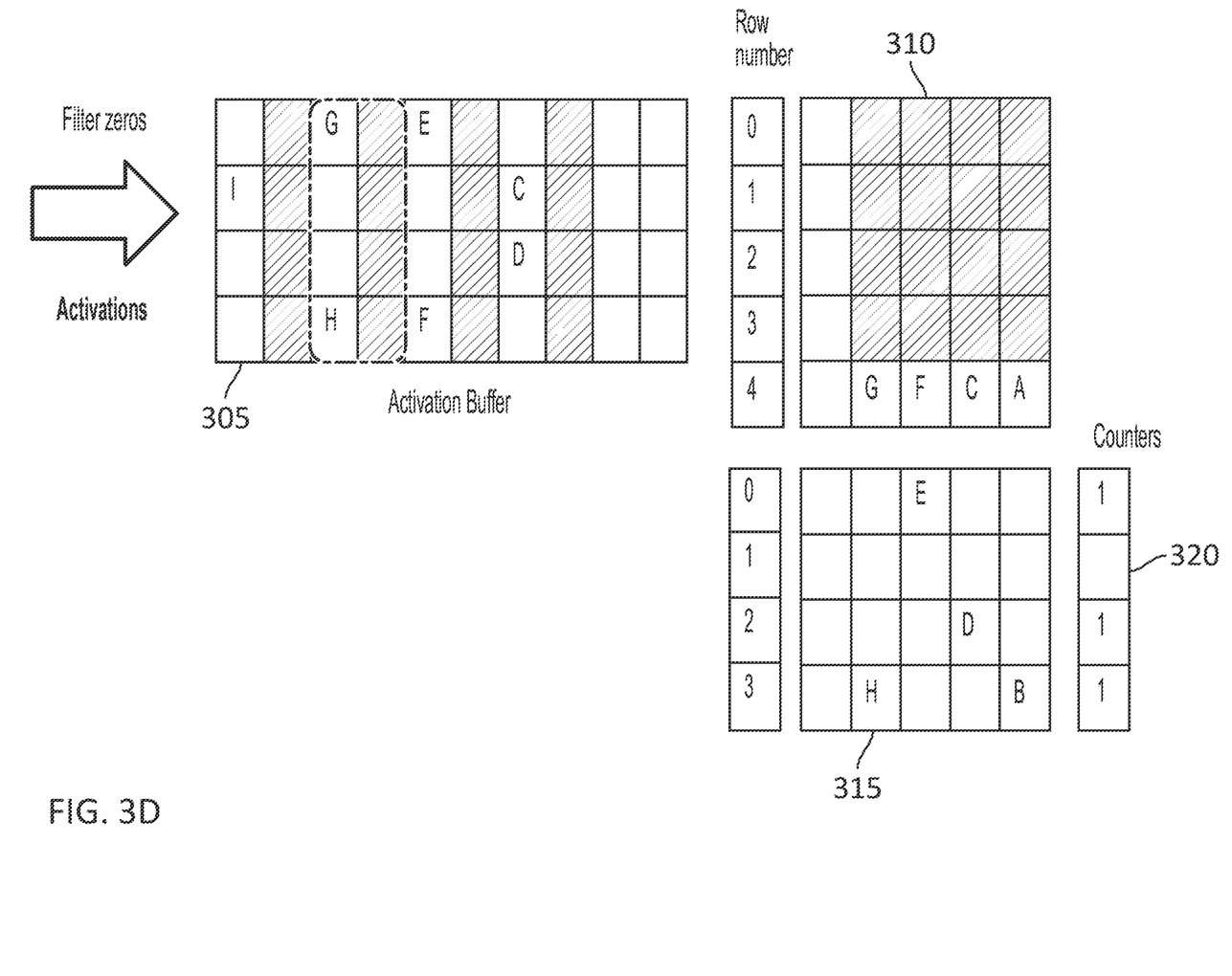
FIG. 3D is a data layout and flow diagram, according to an embodiment of the present disclosure.

In FIG. 3D, the fourth set of activations (in the fourth pair of columns (from the right) of the activation buffer 305) is processed. Two activations, the first and the fourth, are outliers. The residue buffer 315 has the same number of entries in each of the corresponding rows; as such, for purposes of keeping the number of entries in each row as nearly equal as possible it does not matter whether the first most significant part G or the fourth most significant part H is saved in the residue buffer 315. In such a situation (which also occurred for the first and second pairs of columns (as illustrated in FIGS. 3A and 3B respectively), the system may, for example, broadcast, to the shared multiplier 210 of each of the bricks of the set of bricks, the most significant part from the lowest-numbered row having an outlier (in this case broadcasting the value G from row 0), and save the other most significant part (in this case the value H) in the residue buffer 315. This is what is done in FIG. 3D.

Figure 3E:
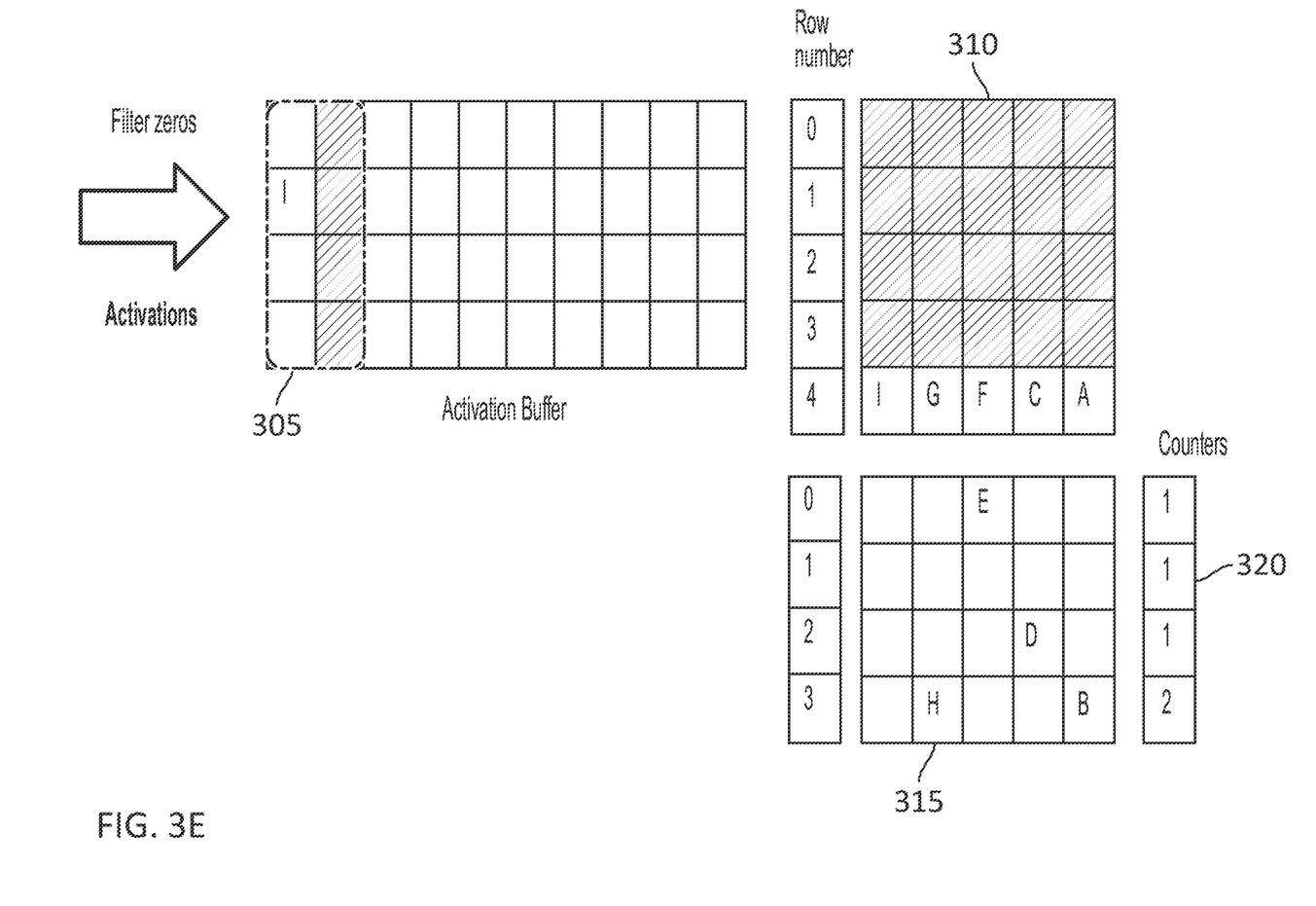
FIG. 3E is a data layout and flow diagram, according to an embodiment of the present disclosure.
Figure 3F:
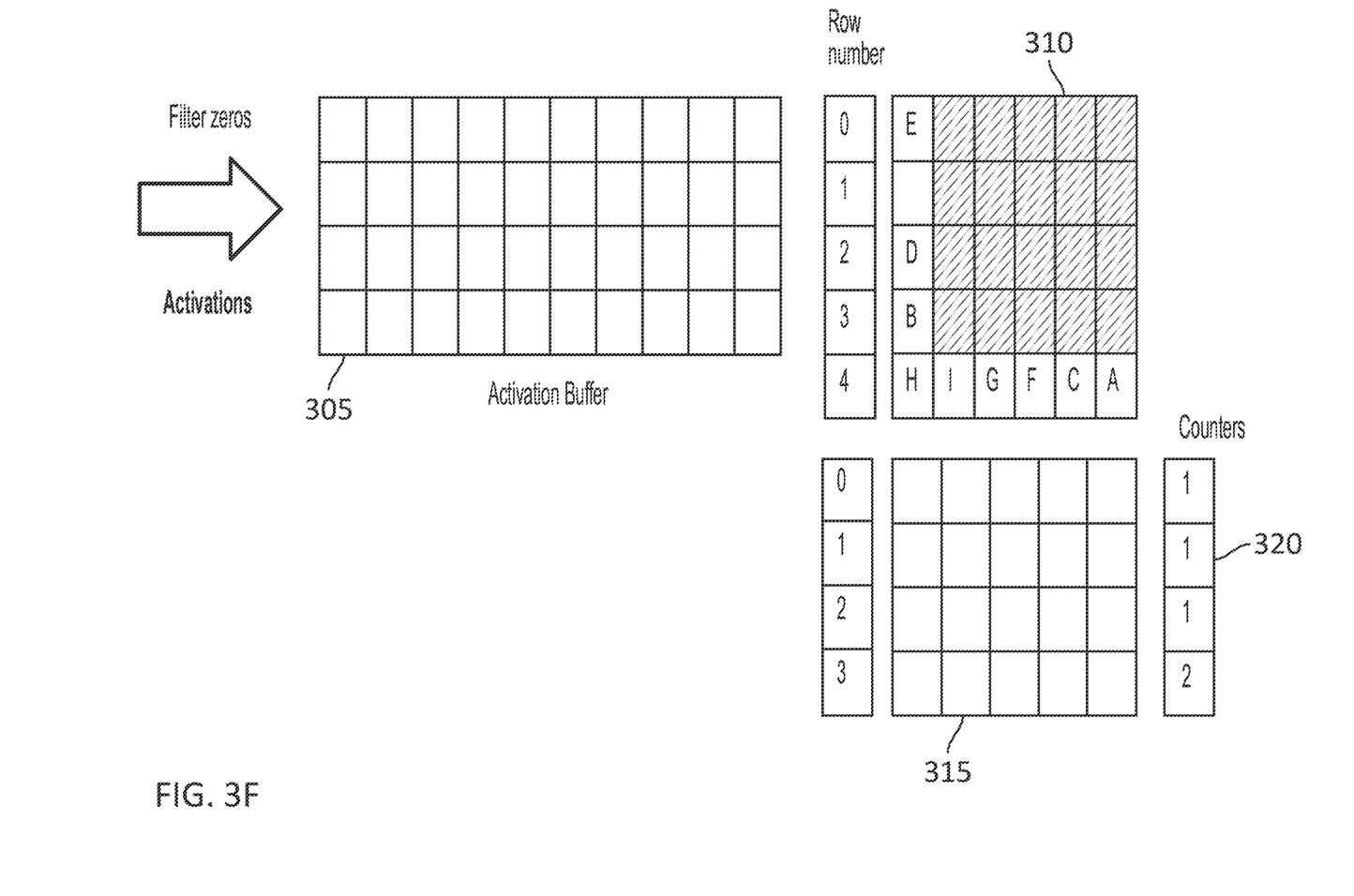
FIG. 3F is a data layout and flow diagram, according to an embodiment of the present disclosure.

In FIG. 3E, the fifth set of activations (in the fifth pair of columns (from the right) of the activation buffer 305) is processed. This set of activations includes only one outlier, and its most significant part, I, is broadcast to the shared multiplier 210 of each of the bricks of the set of bricks. In FIG. 3F, the contents of the residue buffer 315 are broadcast to the set of bricks, completing the processing of the five sets of activations. In some embodiments, more (e.g., 2 or 3) shared multipliers 210 are present in each brick (making possible the handling of more outliers without using the residue buffer 315). In some embodiments the residue buffer 315 is absent. In some embodiments, no shared multiplier 210 is present, and only the residue buffer 315 is used to handle outliers.

Figure 4A:
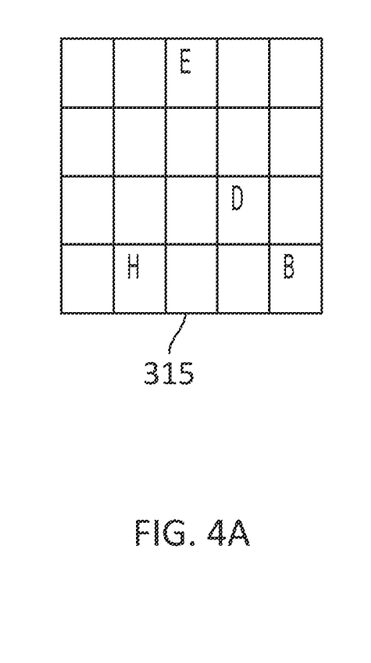
FIG. 4A is a data layout diagram, according to an embodiment of the present disclosure.
Figure 4B:
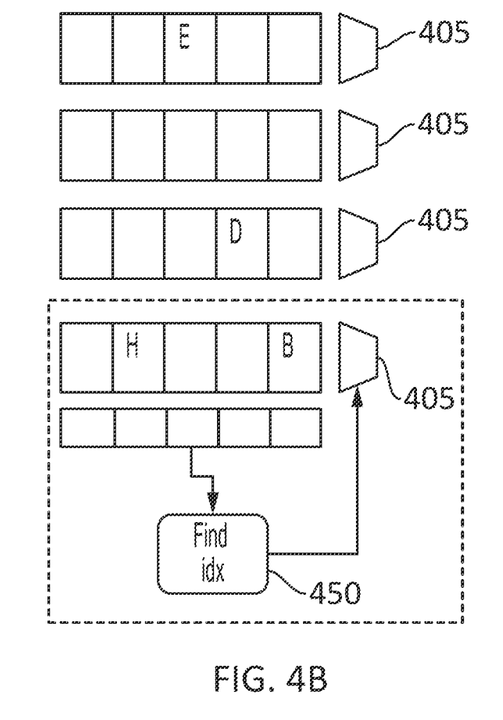
FIG. 4B is a block diagram of a portion of a processing system for performing neural network calculations, according to an embodiment of the present disclosure.

FIG. 4A shows the residue buffer 315, and FIG. 4B shows a circuit for retrieving the stored most significant parts from the residue buffer 315. The circuit includes a plurality of multiplexers 405 and a plurality of index finding circuits 410 (only one of which is shown). Each index finding circuit 410 may control both (i) the multiplexer 405 selecting data from the residue buffer 315 to be broadcast to the bricks 105, and (ii) a multiplexer in each brick 105 for selecting the corresponding weight to be fed into the multiplier.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "array" refers to an ordered set of numbers regardless of how stored (e.g., whether stored in consecutive memory locations, or in a linked list).

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of a system and method for handling outliers have been specifically described and illustrated herein, many modifications and variations will be apparent to those skilled in the art. Accordingly, it is to be understood that a system and method for handling outliers constructed according to principles of this disclosure may be embodied other than as specifically described herein. The invention is also defined in the following claims, and equivalents thereof.

What is claimed is:

1. A method comprising:
   reading a first activation from a first row of an array of activations, the first activation comprising a least significant part and a most significant part, the most significant part being zero;
   multiplying a first weight by the first activation;
   reading a second activation from a second row of the array of activations, the second activation comprising a least significant part and a most significant part, the most significant part being nonzero; and
   multiplying a second weight by the second activation,
   the multiplying of the first weight by the first activation comprising multiplying the first weight by the least significant part of the first activation in a first multiplier, the first multiplier being associated with the first row;
   the multiplying of the second weight by the second activation comprising:
      multiplying the second weight by the least significant part of the second activation in a second multiplier, the second multiplier being associated with the second row; and
      multiplying the second weight by the most significant part of the second activation in a shared multiplier, the shared multiplier being associated with a plurality of rows of the array of activations, including the first row and the second row, and being configured to be in a first state based on most significant parts having a predetermined value.

2. The method of claim 1, further comprising:
   reading a third activation from a third row of the array of activations, the third activation comprising a least significant part and a most significant part, the most significant part being nonzero; and
   multiplying a third weight by the third activation,
   wherein the multiplying of the third weight by the third activation comprises:
      multiplying the third weight by the least significant part of the third activation in a third multiplier, the third multiplier being associated with the third row of the array of activations; and
      storing the most significant part of the third activation in a first row of a buffer comprising a plurality of rows, the first row of the buffer being associated with the third row of the array of activations.

3. The method of claim 2, further comprising incrementing a counter associated with the first row of the buffer.

4. The method of claim 3, wherein the storing of the third activation in the first row of the buffer comprises determining that a value of the counter associated with the first row of the buffer is less than or equal to a value of a counter associated with a row of the buffer corresponding to the second activation.

5. The method of claim 3, wherein the multiplying of the third weight by the most significant part of the third activation further comprises:
   retrieving the most significant part of the third activation from the buffer, and
   multiplying the third weight by the most significant part of the third activation in the third multiplier.

6. The method of claim 3, wherein the multiplying of the third weight by the most significant part of the third activation further comprises:
   retrieving the most significant part of the third activation from the buffer, and
   multiplying the third weight by the most significant part of the third activation in the shared multiplier.

7. The method of claim 2, wherein the most significant part of the third activation has a width of four bits and the least significant part of the third activation has a width of four bits.

8. The method of claim 2, wherein the most significant part of the third activation has a width of three bits and the least significant part of the third activation has a width of five bits.

9. The method of claim 1, wherein the shared multiplier comprises:
a first partial-width multiplier;
a second partial-width multiplier; and
an adder.

10. A system, comprising:
a processing circuit comprising:
a first multiplier;
a second multiplier; and
a shared multiplier;
the processing circuit being configured to:
read a first activation from a first row of an array of activations, the first activation comprising a least significant part and a most significant part, the most significant part being zero;
multiply a first weight by the first activation;
read a second activation from a second row of the array of activations, the second activation comprising a least significant part and a most significant part, the most significant part being nonzero; and
multiply a second weight by the second activation,
the multiplying of the first weight by the first activation comprising multiplying the first weight by the least significant part of the first activation in the first multiplier, the first multiplier being associated with the first row;
the multiplying of the second weight by the second activation comprising:
multiplying the second weight by the least significant part of the second activation in the second multiplier, the second multiplier being associated with the second row; and
multiplying the second weight by the most significant part of the second activation in the shared multiplier, the shared multiplier being associated with a plurality of rows of the array of activations, including the first row and the second row, and being configured to be in a first state based on most significant parts having a predetermined value.

11. The system of claim 10, wherein the processing circuit is further configured to:
read a third activation from a third row of the array of activations, the third activation comprising a least significant part and a most significant part, the most significant part being nonzero; and
multiply a third weight by the third activation,
wherein the multiplying of the third weight by the third activation comprises:
multiplying the third weight by the least significant part of the third activation in a third multiplier, the third multiplier being associated with the third row of the array of activations; and
storing the most significant part of the third activation in a first row of a buffer comprising a plurality of rows, the first row of the buffer being associated with the third row of the array of activations.

12. The system of claim 11, wherein the processing circuit is further configured to increment a counter associated with the first row of the buffer.

13. The system of claim 12, wherein the storing of the third activation in the first row of the buffer comprises determining that a value of the counter associated with the first row of the buffer is less than or equal to a value of a counter associated with a row of the buffer corresponding to the second activation.

14. The system of claim 12, wherein the multiplying of the third weight by the most significant part of the third activation further comprises:
retrieving the most significant part of the third activation from the buffer, and
multiplying the third weight by the most significant part of the third activation in the third multiplier.

15. The system of claim 12, wherein the multiplying of the third weight by the most significant part of the third activation further comprises:
retrieving the most significant part of the third activation from the buffer, and
multiplying the third weight by the most significant part of the third activation in the shared multiplier.

16. The system of claim 11, wherein the most significant part of the third activation has a width of four bits and the least significant part of the third activation has a width of four bits.

17. The system of claim 11, wherein the most significant part of the third activation has a width of three bits and the least significant part of the third activation has a width of five bits.

18. The system of claim 10, wherein the shared multiplier comprises:
a first partial-width multiplier;
a second partial-width multiplier; and
an adder.

19. A system, comprising:
means for processing comprising:
a first multiplier;
a second multiplier; and
a shared multiplier;
the means for processing being configured to:
read a first activation from a first row of an array of activations, the first activation comprising a least significant part and a most significant part, the most significant part being zero;
multiply a first weight by the first activation;
read a second activation from a second row of the array of activations, the second activation comprising a least significant part and a most significant part, the most significant part being nonzero; and
multiply a second weight by the second activation,
the multiplying of the first weight by the first activation comprising multiplying the first weight by the least significant part of the first activation in the first multiplier, the first multiplier being associated with the first row;
the multiplying of the second weight by the second activation comprising:
multiplying the second weight by the least significant part of the second activation in the second multiplier, the second multiplier being associated with the second row; and
multiplying the second weight by the most significant part of the second activation in the shared multiplier, the shared multiplier being associated with a plurality of rows of the array of activations, including the first row and the second row, and being configured to be in a first state based on most significant parts having a predetermined value.

20. The system of claim 19, wherein the means for processing is further configured to:
   read a third activation from a third row of the array of activations, the third activation comprising a least significant part and a most significant part, the most significant part being nonzero; and
   multiply a third weight by the third activation,
   wherein the multiplying of the third weight by the third activation comprises:
      multiplying the third weight by the least significant part of the third activation in a third multiplier, the third multiplier being associated with the third row of the array of activations; and
      storing the most significant part of the third activation in a first row of a buffer comprising a plurality of rows, the first row of the buffer being associated with the third row of the array of activations.

* * * * *